United States Patent
Burtovyy

(10) Patent No.: US 11,639,405 B2
(45) Date of Patent: *May 2, 2023

(54) FAST PHOTOCURABLE POLYCYCLOOLEFIN COMPOSITIONS AS OPTICAL OR 3D PRINTING MATERIALS

(71) Applicant: PROMERUS, LLC, Brecksville, OH (US)

(72) Inventor: Oleksandr Burtovyy, Brecksville, OH (US)

(73) Assignee: PROMERUS, LLC, Akron, OH (US)

( * ) Notice: Subject to any disclaimer, the term of this patent is extended or adjusted under 35 U.S.C. 154(b) by 363 days.

This patent is subject to a terminal disclaimer.

(21) Appl. No.: 16/886,951

(22) Filed: May 29, 2020

(65) Prior Publication Data

US 2020/0377632 A1 Dec. 3, 2020

Related U.S. Application Data

(60) Provisional application No. 62/855,064, filed on May 31, 2019.

(51) Int. Cl.
| | | |
|---|---|---|
| *C08F 232/08* | (2006.01) | |
| *C08F 132/08* | (2006.01) | |
| *C08J 5/18* | (2006.01) | |
| *C08F 220/10* | (2006.01) | |
| *C08F 32/08* | (2006.01) | |

(52) U.S. Cl.
CPC .......... *C08F 132/08* (2013.01); *C08F 220/10* (2013.01); *C08F 232/08* (2013.01); *C08J 5/18* (2013.01); *C08F 32/08* (2013.01); *C08J 2333/06* (2013.01); *C08J 2345/00* (2013.01)

(58) Field of Classification Search
None
See application file for complete search history.

(56) References Cited

U.S. PATENT DOCUMENTS 10,626,198 B2 * 4/2020 Rhodes .................. C08F 32/08
2006/0041093 A1 * 2/2006 Ravikiran .............. C08G 61/06
　　　　　　　　　　　　　　　　　　　　　　　　　　　　526/280
2012/0056183 A1　　3/2012　Mueller et al.

FOREIGN PATENT DOCUMENTS

| EP | 2676978 A1 | 12/2013 | |
|---|---|---|---|
| JP | 2012093396 A * | 5/2012 | |
| WO | WO 2014-044359 A1 | 3/2014 | |
| WO | WO 2018-022952 A1 | 2/2018 | |
| WO | WO 2018-129121 A1 | 7/2018 | |
| WO | WO-2018129121 A1 * | 7/2018 | ................ C08F 2/38 |

OTHER PUBLICATIONS

Written Opinion of PCT/US2020/035048, dated Sep. 17, 2020; Also see WO 2020/243381 A1, dated Dec. 3, 2020.

* cited by examiner

*Primary Examiner* — Richard A Huhn
(74) *Attorney, Agent, or Firm* — Balaram Gupta

(57) ABSTRACT

Embodiments in accordance with the present invention encompass compositions encompassing a procatalyst, a photoacid generator, a photosensitizer and one or more monomers which undergo vinyl addition polymerization when said composition is exposed to suitable UV irradiation and heated to a temperature from 50° C. to 100° C. to form a substantially transparent film. The monomers employed therein have a range of refractive index from 1.4 to 1.6 and thus these compositions can be tailored to form transparent films of varied refractive indices. Accordingly, compositions of this invention are useful in various opto-electronic applications, including as coatings, encapsulants, fillers, leveling agents, among others.

1 Claim, No Drawings

FAST PHOTOCURABLE POLYCYCLOOLEFIN COMPOSITIONS AS OPTICAL OR 3D PRINTING MATERIALS

CROSS REFERENCE TO RELATED APPLICATIONS

This application claims the benefit of U.S. Provisional Application No. 62/855,064, filed May 31, 2019, which is incorporated herein by reference in its entirety.

BACKGROUND OF THE INVENTION

Field of the Invention

Embodiments in accordance with the present invention relate generally to a single component mass polymerizable polycycloolefin monomer compositions having high optical to transparency and are useful in forming 3D objects and for forming optical layers having utility in a variety of optical devices, such as optical sensors, light emitting diodes (LEDs), organic light emitting diode (OLED), among other devices. More specifically, this invention relates to single component compositions encompassing norbornene (NB) based olefinic monomers, which undergo mass polymerization when subjected to photolytic conditions to form 3D objects and/or optical layers having utility in a variety of opto-electronic applications including as encapsulants, coatings, and fillers.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U.S. Patent Application Publication No. US2012/0009393 A1.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

U.S. Pat. No. 10,626,198, issued Apr. 21, 2020, discloses a one component mass polymerizable composition which is capable of tailoring to the desirable refractive index and is suitable as a filler and a protective coating material, thus potentially useful in the fabrication of a variety of OLED devices.

However, there is still a need for organic filler materials that complement the refractive index of OLEDs and yet exhibit high transparency and good thermal properties, among other desirable properties. In addition, it is desirable that such organic filler materials are fast curable and readily form a permanent protective coatings and are available as a single component composition for dispensing with such OLED layers.

Thus, it is an object of this invention to provide organic materials that overcome the gaps faced by the art. More specifically, it is an object of this invention to provide a single component composition that will mass polymerize under the conditions of the fabrications of an OLED device at a faster rate than the ones available in the art. It is further an object of this invention to provide stable single component mass polymerizable composition with no change in viscosity at or below normal storage conditions but which undergoes mass polymerization only under the process conditions in which the OLED device is finally fabricated, such as for example by the use of radiation and/or thermal process.

Other objects and further scope of the applicability of the present invention will become apparent from the detailed description that follows.

SUMMARY OF THE INVENTION

Surprisingly, it has now been found that by employing a single component filler composition, it is now possible to fabricate an OLED device at a much faster rate and yet having a transparent optical layer which features hitherto unachievable properties, i.e., refractive index in the range of 1.4 to 1.6 or higher, high colorless optical transparency, desirable film thickness of the filler layer typically in the range of 10 to 20 μm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically or thermally treated at less than 100° C., adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i. e., no change in viscosity) at ambient atmospheric conditions including up to 35° C. for several hours, and undergo mass polymerization only when subjected to suitable radiation and above 50° C. or higher temperature. The compositions cure very quickly when subjected to radiation at ambient conditions and then subjected to temperatures higher than 50° C. and generally the compositions are cured in less than one hour after exposure to suitable radiation and thermal conditions.

Advantageously, the compositions of this invention are also compatible with a "one drop fill" (commonly known as "ODF"). In a typical ODF process, which is commonly used to fabricate a top emission OLED device, a special optical fluid is applied to enhance the transmission of light from the device to the top cover glass, and the fluid is dispensed by an ODF method. Although the method is known as ODF which can be misleading because several drops or lines of material are generally dispensed inside the seal lines. After applying the fluid, the fluid spreads out as the top glass is laminated, analogous to die-attach epoxy. This process is generally carried out under vacuum to prevent air entrapment. The present invention allows for a material of low viscosity which readily and uniformly coats the substrate with rapid flow in a short period of time. Even more advantageously, the present invention overcomes the deficiencies faced by the prior art in that a single component composition is much more convenient than employing a two component system especially in an ODF method.

In addition, the compositions of this invention can also be used as 3D printing materials.

In another aspect of this invention there is also provided a kit encompassing the composition of this invention for forming a transparent object as described herein.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol " ∿ " denotes a position at which the bonding takes place with another repeat unit or another atom or molecule or group or moiety as appropriate with the structure of the group as shown.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, $-CO_2H$, an ester, an amide, $(C_1-C_6)$alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "derived" is meant that the polymeric repeating units are polymerized (formed) from, for example, polycyclic norbornene-type monomers in accordance with formulae (I) to (IV) wherein the resulting polymers are formed by 2,3 enchainment of norbornene-type monomers as shown below:

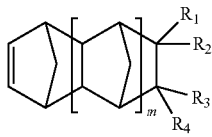

Accordingly, in accordance with the practice of this invention there is provided a single component composition encompassing one or more monomers of formula (I), a palladium procatalyst, a photoacid generator and a photosensitizer, wherein:

said monomer of formula (I) is:

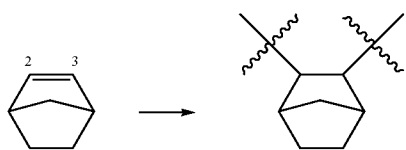

(I)

wherein:

m is an integer 0, 1 or 2;

$R_1$, $R_2$, $R_3$ and $R_4$ are the same or different and each independently selected from the group consisting of hydrogen, halogen, methyl, ethyl, linear or branched $(C_3-C_{12})$alkyl, perfluoro$(C_1-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_3)$alkyl, methoxy, ethoxy, linear or branched $(C_3-C_{16})$alkoxy, $(C_2-C_6)$acyl, $(C_2-C_6)$acyloxy, hydroxy$(C_1-C_{16})$alkyl, $(C_2-C_6)$acyloxy$(C_1-C_{16})$alkyl, and a group to of formula (B):

—Y-Aryl (B)

wherein:

Y is selected from the group consisting of:

$(CR_5R_6)_a$, $O(CR_5R_6)_a$ and $(CR_5R_6)_aO$, where a is an integer from 0 to 12, inclusive, $R_5$ and $R_6$ are the same or different and each independently selected from hydrogen, methyl, ethyl, linear or branched $(C_3-C_{12})$alkyl and substituted or unsubstituted $(C_6-C_{14})$aryl;

Aryl is phenyl or biphenyl substituted with one or more $(C_1-C_6)$alkyl; or one of $R_1$ and $R_2$ taken together with one of $R_3$ and $R_4$ and the carbon atoms to which they are attached to form a substituted or unsubstituted $(C_5-C_{14})$cyclic, $(C_5-C_{14})$bicyclic or $(C_5-C_{14})$tricyclic ring;

and said composition is in a clear liquid form at room temperature.

In some embodiments one of $R_1$, $R_2$, $R_3$ and $R_4$ may be a group which is selected from the group consisting of:

a group of formula (A1):

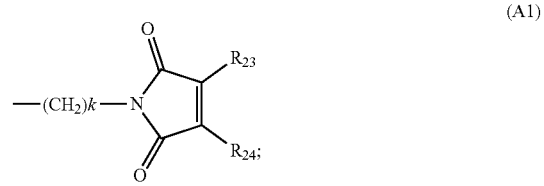

(A1)

a group of formula (A2):

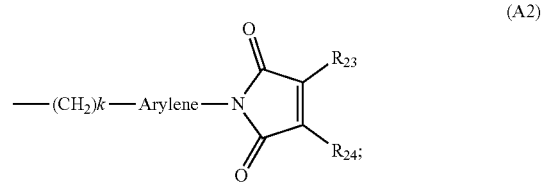

(A2)

a group of formula (A3):

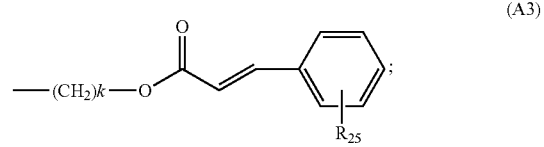

(A3)

and a group of formula (A4):

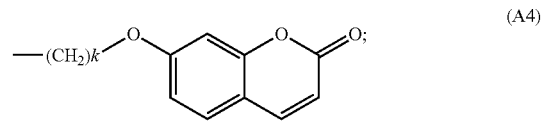

(A4)

Aryl is substituted or unsubstituted biphenyl of formula:

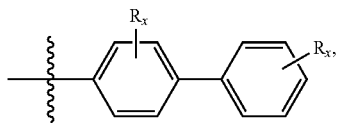

substituted or unsubstituted naphthyl of formula:

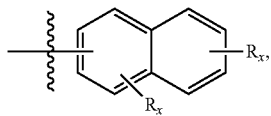

substituted or unsubstituted terphenyl of formula:

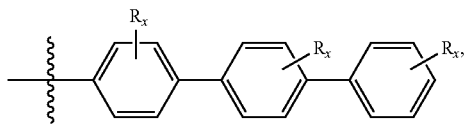

substituted or unsubstituted anthracenyl of formula:

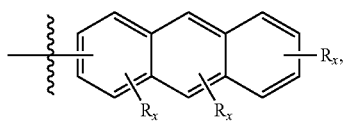

substituted or unsubstituted fluorenyl of formula:

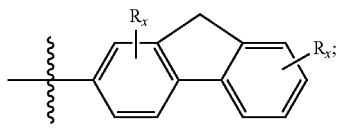

where $R_x$ in each occurrence is independently selected from methyl, ethyl, linear or branched $(C_3-C_{12})$alkyl or $(C_6-C_{10})$aryl;

k is an integer from 1 to 12;

$R_{23}$, $R_{24}$ and $R_{25}$ are the same or different and each independently selected from the group consisting of hydrogen, methyl, ethyl, linear or branched $(C_3-C_{12})$alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_3)$alkyl; or $R_{23}$ and $R_{24}$ taken together with the intervening carbon atoms to which they are attached to form a substituted or unsubstituted $(C_5-C_{14})$cyclic, $(C_5-C_{14})$bicyclic or $(C_5-C_{14})$ tricyclic ring; and Arylene is substituted or unsubstituted bivalent $(C_6-C_{14})$aryl;

The monomers employed in the composition of this invention are themselves known in the literature or can be prepared by any of the known methods in the art to make such or similar types of monomers.

In addition, the monomers as described herein readily undergo mass polymerization, i.e., in their neat form without use of any solvents by vinyl addition polymerization using transition metal procatalysts, such as for example, nickel, palladium or platinum. See for example, U.S. Pat. Nos. 6,455,650; 6,825,307; and 7,910,674; pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the procatalyst and/or the photoacid generator or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the catalyst, photoacid generator and/or monomers can be employed in this invention. Examples of such solvents include alkanes, cycloalkane, THF, dichloromethane, dichloroethane, and the like.

Advantageously, it has now been found that one or more of the monomers themselves can be used to dissolve the procatalyst as well as the photoacid generator and thus avoiding the need for the use of solvents. In addition, one monomer can itself serve as a solvent for the other monomer and thus eliminating the need for an additional solvent. For example, if one monomer of formula (I) is a solid at room temperature, then a second monomer of formula (I), which is liquid at room temperature can be used as a solvent for the monomer of formula (I) which is a solid or vice versa. Therefore, in such situations more than one monomer can be employed in the composition of this invention.

In a further embodiment of this invention the composition of this invention encompasses at least two distinct monomers of formula (I).

In general, the composition of this invention exhibits low viscosity, which can be below 100 centipoise. In some embodiments, the viscosity of the composition of this invention is less than 90 centipoise. In some other embodiments the viscosity of the composition of this invention is in the range from about 10 to 100 centipoise. In yet some other embodiments the viscosity of the composition of this invention is lower than 80 cP, lower than 60 cP, lower than 40 cP, lower than 20 cP. In some other embodiments it may even be lower than 20 cP.

When the composition of this invention contains two monomers, they can be present in any desirable amounts that would bring about the intended benefit, including either refractive index modification or viscosity modification or both. Accordingly, the molar ratio of first monomer of formula (I) to second monomer of formula (I) can be from 1:99 to 99:1. In some embodiments, the molar ratio of first monomer of formula (I):second monomer of formula (I) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on.

In general, the compositions in accordance with the present invention encompass the above described one or more of the monomers of formula (I), as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of distinct monomers of formula (I) makes it possible to tailor a composition having the desirable refractive index, viscosity and optical transmission properties. In addition, it may be desirable to include other polymeric or monomeric materials which are compatible to provide desirable optical properties depending upon the end use application. Accordingly, the compositions of this invention can also include other high refractive polymeric materials which will bring about such intended benefit. Examples of such polymers include without any limitation, poly($\alpha$-methylstyrene), poly (vinyl-toluene), copolymers of $\alpha$-methylstyrene and vinyl-toluene, and the like.

Advantageously, it has further been found that the compositions of this invention can also contain additional monomers. In some embodiments, the composition according to this invention may further contain one or more monomers selected from monomer of formula (III) or monomer of formula (IV).

The monomer of formula (III) is:

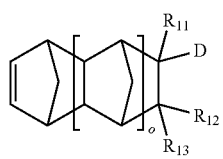
(III)

wherein:
o is an integer from 0 to 2, inclusive;
D is $SiR_{14}R_{15}R_{16}$ or a group selected from:

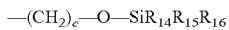
(E);

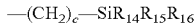
(F);

and

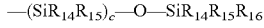
(G);

wherein c is an integer from 1 to 10, inclusive, and where one or more of $CH_2$ is optionally substituted with $(C_1-C_{10})$alkyl, $(C_1-C_{10})$perfluoroalkyl or $(C_6-C_{14})$aryl;

$R_{11}$, $R_{12}$ and $R_{13}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{14}$, $R_{15}$ and $R_{16}$ are each independently of one another methyl, ethyl, linear or branched $(C_3-C_9)$alkyl, substituted or unsubstituted $(C_6-C_{14})$aryl, methoxy ethoxy, linear or branched $(C_3-C_9)$alkoxy or substituted or unsubstituted $(C_6-C_{14})$aryloxy.

In this aspect of the invention, it has now been found that monomers of formula (III) provides further advantages. Namely, the monomers of formula (III) depending upon the nature of the monomer may impart high or low refractive index to the composition, thus it can be tailored to meet the need. In addition, the monomers of formula (III) generally improve the adhesion properties and thus can be used as "adhesion modifiers." Finally, the monomers of formula (III) may exhibit low viscosity and good solubility for the procatalyst and/or photoacid generator, among various other advantages.

The monomer of formula (IV) is:

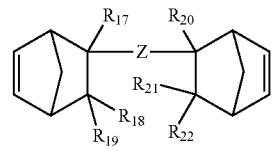
(IV)

wherein:
Z is selected from the group consisting of substituted or unsubstituted $(C_1-C_{12})$alkylene, $-(CH_2)_dO(CH_2)_e-$, $-(CH_2)_d(SiR_{26}R_{27})(OSiR_{28}R_{29})_f(CH_2)_e-$ where d, e and f are independently integers from 0 to 6, inclusive, $R_{26}$, $R_{27}$, $R_{28}$ and $R_{29}$ are the same or different and independently of each other selected from methyl, ethyl, linear or branched $(C_3-C_{12})$alkyl and an arylene selected from the following:

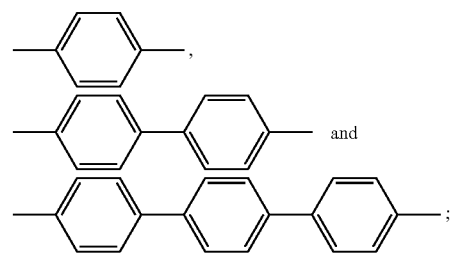

$R_{17}$, $R_{18}$, $R_{19}$, $R_{20}$, $R_{21}$ and $R_{22}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$-aryloxy.

The monomers of formula (IV) are bifunctional monomers and may exhibit high refractive index especially when Z is an arylene group. Accordingly, it is contemplated that incorporation of monomers of formula (IV) into composition of this invention generally increases the refractive index of the composition and also increase crosslinkability with other molecules. Thus, by incorporation of monomers of formula (IV) into the composition of this invention it may be possible to increase compatibility with other materials depending upon the intended application thereby enhancing the properties of the composition of the invention.

Furthermore, the composition of this invention may also contain optionally one or more monomers of formula (VI):

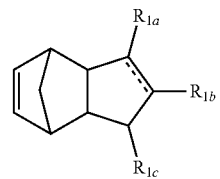
(VI)

wherein

===== is a single bond or a double bond;

$R_{1a}$ and $R_{1b}$ are the same or different and each independently selected from the group consisting of hydrogen, methyl, ethyl, linear or branched $(C_3-C_6)$alkyl, methoxy, ethoxy, linear or branched $(C_3-C_6)$alkyloxy, acetoxy, $(C_2-C_6)$acyl, phenyl and phenoxy; or $R_{1a}$ taken together with $R_{1b}$ and the carbon atoms to which they are attached to form a to $(C_5-C_9)$cycloalkyl or a $(C_6-C_{12})$bicycloalkyl ring optionally containing one or more double bonds;

$R_{1c}$ is hydrogen, halogen, methyl, ethyl, linear or branched $(C_3-C_{16})$alkyl, $(C_6-C_{10})$aryl, $(C_6-C_{10})$aryl$(C_1-C_6)$alkyl, hydroxy, methoxy, ethoxy, linear or branched $(C_3-C_{16})$alkoxy, $(C_6-C_{10})$aryloxy, $(C_6-C_{10})$aryl$(C_1-C_6)$alkoxy, —O(CO)$R_{1d}$ and —O(CO)O$R_{1d}$, where $R_{1d}$ is methyl, ethyl, linear or branched $(C_3-C_{16})$alkyl, $(C_6-C_{10})$aryl and $(C_6-C_{10})$aryl$(C_1-C_6)$alkyl. Representative examples of monomer of formula (IV) include the following without any limitations:

dicyclopentadiene (DCPD)

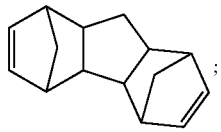

4,4a,4b,5,8,8a,9,9a-octahydro-1H-1,4:5,8-dimethanofluorene (one of trimers of cyclopentadiene, TCPD2)

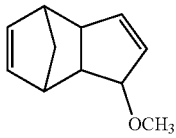

OCH$_3$;

1-methoxy-dicyclopentadiene

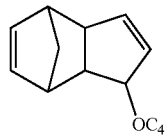

OC$_4$H$_9$;

1-(n-butoxy)-dicyclopentadiene

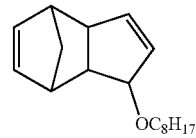

OC$_8$H$_{17}$;

1-(n-octyloxy)-dicyclopentadiene

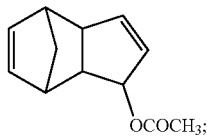

OCOCH$_3$;

3a,4,7,7a-tetrahydro-1H-4,7-methanoinden-1-yl acetate

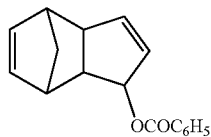

OCOC$_6$H$_5$;

3a,4,7,7a-tetrahydro-1H-4,7-methanoinden-1-yl benzoate

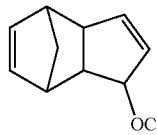

OCOCH$_2$C$_6$H$_5$; and 3a,4,7,7a-tetrahydro-1H-4,7-methanoinden-1-yl 2-phenylacetate

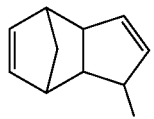

OCOCH$_2$CH$_2$C$_6$H$_5$.

3a,4,7,7a-tetrahydro-1H-4,7-methanoinden-1-yl 3-phenylpropanoate

In another aspect of this invention it is conceivable that the composition of this invention may contain only one monomer of formula (I) or may additionally contain one or more monomers of formula (III) or formula (IV). That is, any one or more monomers of formulae (I) can be combined with one or more monomers of formulae (III) or (IV) to form a composition of this invention, as needed. In some other embodiments the composition of this invention encompasses any two monomers of formulae (I), which are further combined with one or more monomers of formula (III) or (IV) and in any desirable proportions. All such possible permutations and combinations of monomers of formulae (I) in combination with one or more monomers of formula (III) or (IV) are part of this invention.

Accordingly, any of the monomers within the scope of monomer of formula (I) can be employed in the composition of the invention. Representative examples of monomer of formula (I) include the following without any limitations:

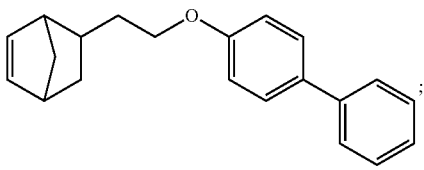

5-(2-([1,1'-biphenyl]-4-yloxy)ethyl)bicyclo[2.2.1]hept-2-ene

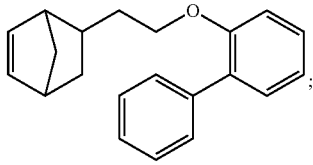

5-(2-([1,1'-biphenyl]-2-yloxy)ethyl)bicyclo[2.2.1]hept-2-ene (NBEtOPhPh)

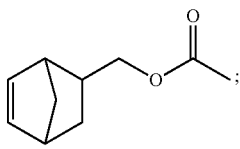

bicyclo[2.2.1]hept-5-en-2-ylmethyl acetate (MeOAcNB)

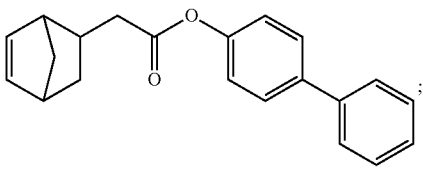

[1,1'-biphenyl]-4-yl 2-(bicyclo[2..2.1]hept-5-en-2-yl)acetate

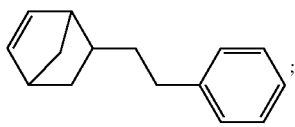

5-phenethylbicyclo[2.2.1]hept-2-ene (PENB)

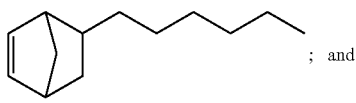

5-hexylbicyclo[2.2.1]hept-2-ene (HexylNB)

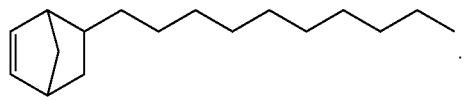

5-decylbicyclo[2.2.1]hept-2-ene (DecylNB)

Various other monomers within the scope of monomer of formula (I), monomer of formula (III) and monomer of formula (IV) can be employed in the composition of the invention. Representative examples of such monomers include the following without any limitations:

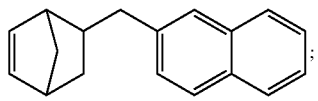

2-(bicyclo[2.2.1]hept-5-en-2-ylmethyl)naphthalene

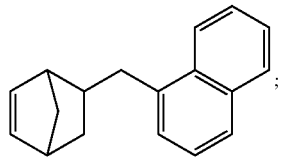

1-(bicyclo[2.2.1]hept-5-en-2-ylmethyl)naphthalene

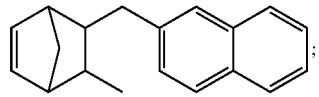

2-((3-methylbicyclo[2.2.1]hept-5-en-2-yl)methyl)naphthalene

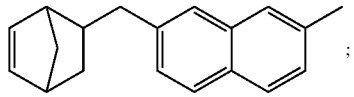

2-(bicyclo[2.2.1]hept-5-en-2-ylmetyl)-7-methylnaphthalene

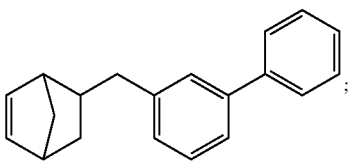

5-([1,1'-biphenyl]-3-ylmethyl)bicyclo[2.2.1]hept-2-ene

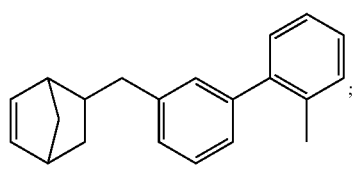

5-((2'-methyl-[1,1'-biphenyl]-3-yl)methyl)bicyclo[2.2.1]hept-2-ene

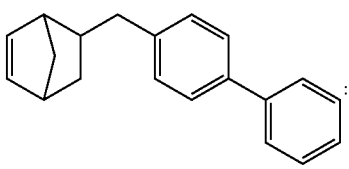

5-([1,1'-biphenyl]-4-ylmethyl)bicyclo[2.2.1]hept-2-ene

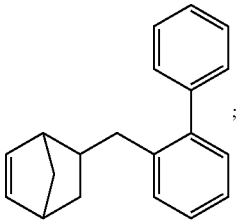

5-([1,1'-biphenyl]-2-ylmethyl)bicyclo[2.2.1]hept-2-ene

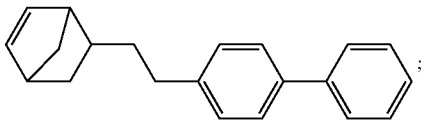

5-(2-([1,1'-biphenyl]-4-yl)ethyl)bicyclo[2.2.1]hept-2-ene (NBEtPhPh)

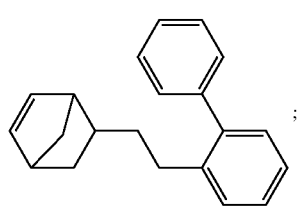

5-(2([1,1'-biphenyl]-2-yl)ethyl)bicyclo[2.2.1]hept-2-ene

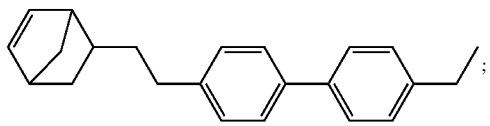

5-(2([4'-ethyl-[1,1'-biphenyl]-4-yl)ethyl)bicyclo[2.2.1]hept-2-ene

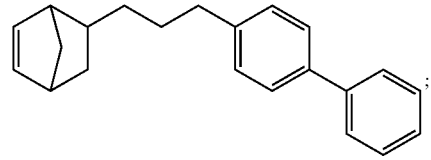

5-(3-([1,1'-biphenyl]-4-yl)propyl)bicyclo[2.2.1]hept-2-ene

-continued

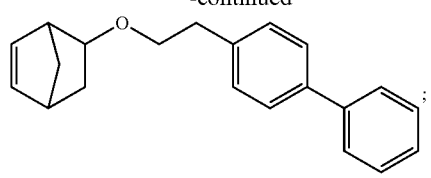
5-(2-([1,1'-biphenyl]-4-yl)ethoxy)bicyclo[2.2.1]hept-2-ene

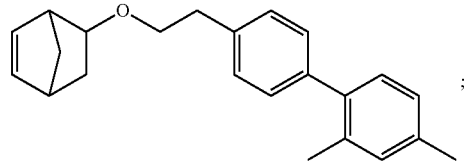
5-(2-(2',4'-dimethyl-([1,1'-biphenyl]-4-yl)ethoxy)bicyclo[2.2.1]hept-2-ene

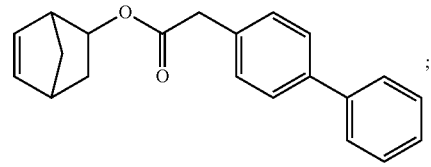
bicyclo[2.2.1]hept-5-en-2-yl 2-([1,1'-biphenyl]-4-yl)acetate

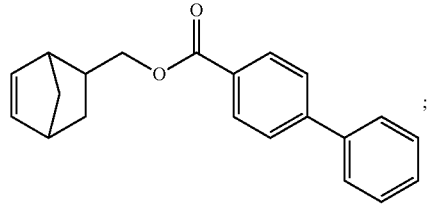
bicyclo[2.2.1]hept-5-en-2-ylmethyl [1,1'-biphenyl]-4-carboxylate

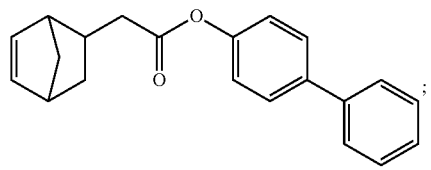
[1,1'-biphenyl]-4-yl 2-bicyclo[2.2.1]hept-5-en-2-yl)acetate

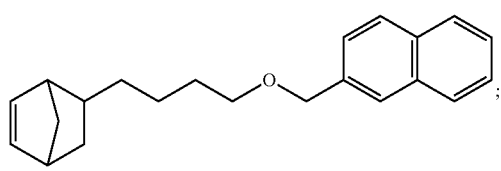
2-((4-(bicyclo[2.2.1]hept-5-en-2-yl)butoxy)methyl)naphthalene

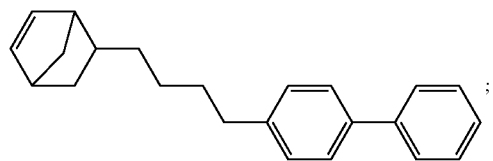
5-(4-([1,1'-biphenyl]-4-yl)butyl)bicyclo[2.2.1]hept-2-ene

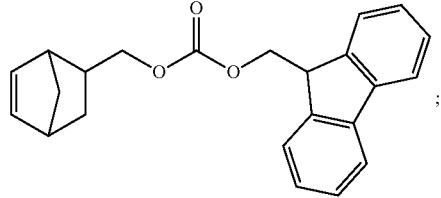
(9H-fluoren-9-yl)methyl (bicyclo[2.2.1]hept-5-en-2-ylmethyl) carbonate -continued

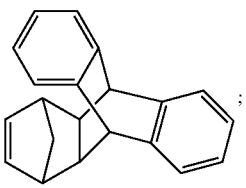
(9R,10S,11R,12S)-9,10-dihydro-9,10-[2]bicycloanthracene

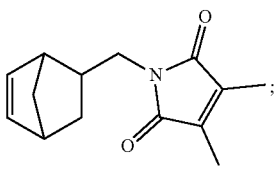
1-(4-bicyclo[2.2.1]hept-5-en-2-ylmethyl)-3,4-dimethyl-1H-pyrrole-2,5-dione (MeDMMINB)

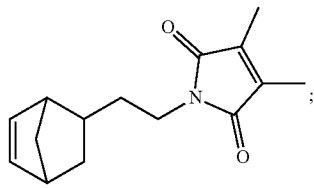
1-(4-bicyclo[2.2.1]hept-5-en-2-ylethyl)-3,4-dimethyl-1H-pyrrole-2,5-dione (EtDMMINB)

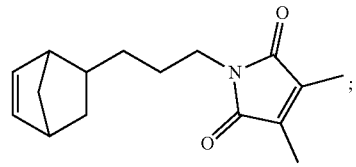
1-(4-bicyclo[2.2.1]hept-5-en-2-ylpropyl)-3,4-dimethyl-1H-pyrrole-2,5-dione (PrDMMINB)

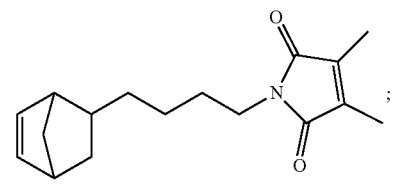
1-(4-bicyclo[2.2.1]hept-5-en-2-ylbutyl)-3,4-dimethyl-1H-pyrrole-2,5-dione (BuDMMINB)

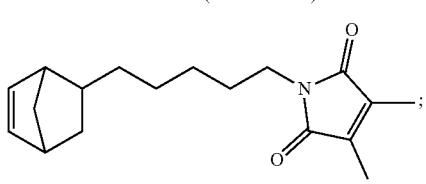
1-(4-bicyclo[2.2.1]hept-5-en-2-ylpentyl)-3,4-dimethyl-1H-pyrrole-2,5-dione (PentylDMMINB)

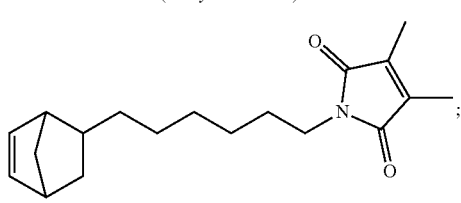
1-(4-bicyclo[2.2.1]hept-5-en-2-ylhexyl)-3,4-dimethyl-1H-pyrrole-2,5-dione (HxDMMINB)

-continued

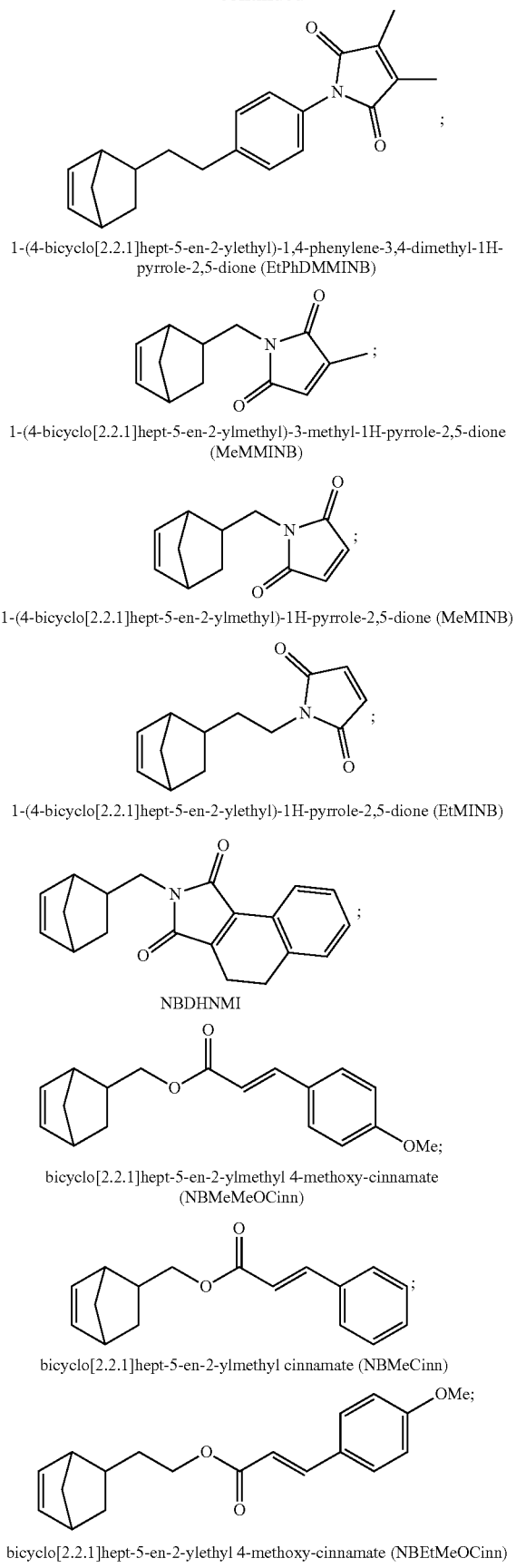

1-(4-bicyclo[2.2.1]hept-5-en-2-ylethyl)-1,4-phenylene-3,4-dimethyl-1H-pyrrole-2,5-dione (EtPhDMMINB)

1-(4-bicyclo[2.2.1]hept-5-en-2-ylmethyl)-3-methyl-1H-pyrrole-2,5-dione (MeMMINB)

1-(4-bicyclo[2.2.1]hept-5-en-2-ylmethyl)-1H-pyrrole-2,5-dione (MeMINB)

1-(4-bicyclo[2.2.1]hept-5-en-2-ylethyl)-1H-pyrrole-2,5-dione (EtMINB)

NBDHNMI bicyclo[2.2.1]hept-5-en-2-ylmethyl 4-methoxy-cinnamate (NBMeMeOCinn)

bicyclo[2.2.1]hept-5-en-2-ylmethyl cinnamate (NBMeCinn)

bicyclo[2.2.1]hept-5-en-2-ylethyl 4-methoxy-cinnamate (NBEtMeOCinn)

-continued

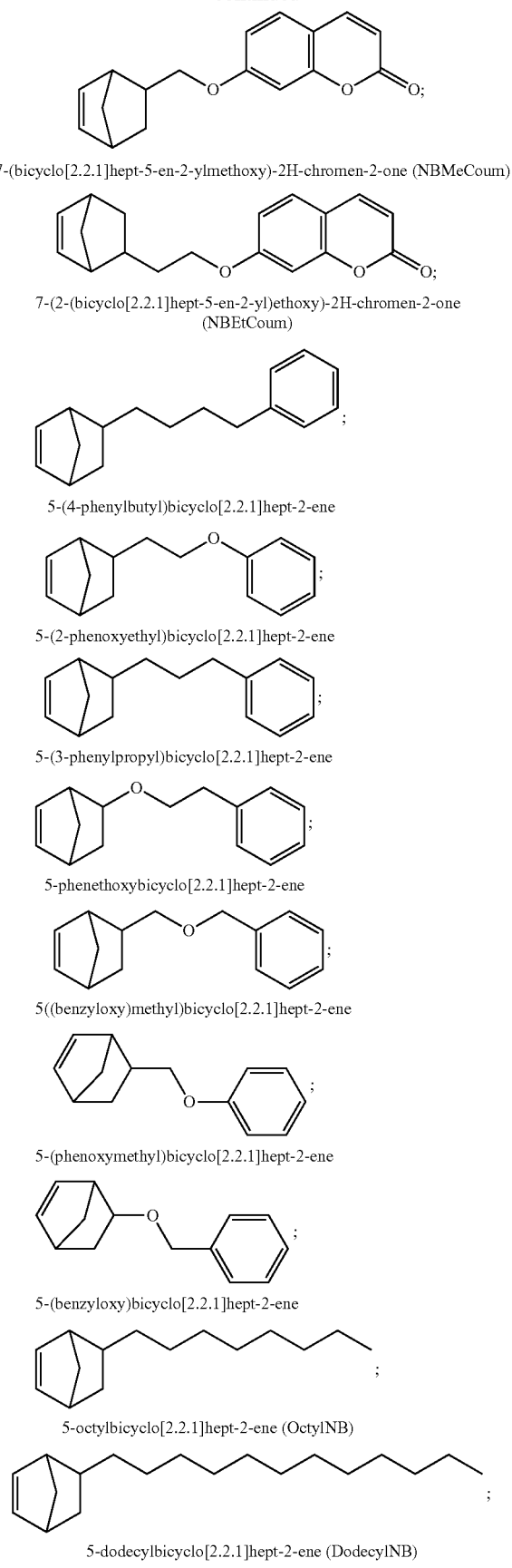

7-(bicyclo[2.2.1]hept-5-en-2-ylmethoxy)-2H-chromen-2-one (NBMeCoum)

7-(2-(bicyclo[2.2.1]hept-5-en-2-yl)ethoxy)-2H-chromen-2-one (NBEtCoum)

5-(4-phenylbutyl)bicyclo[2.2.1]hept-2-ene 5-(2-phenoxyethyl)bicyclo[2.2.1]hept-2-ene 5-(3-phenylpropyl)bicyclo[2.2.1]hept-2-ene 5-phenethoxybicyclo[2.2.1]hept-2-ene 5((benzyloxy)methyl)bicyclo[2.2.1]hept-2-ene 5-(phenoxymethyl)bicyclo[2.2.1]hept-2-ene 5-(benzyloxy)bicyclo[2.2.1]hept-2-ene 5-octylbicyclo[2.2.1]hept-2-ene (OctylNB)

5-dodecylbicyclo[2.2.1]hept-2-ene (DodecylNB)

-continued

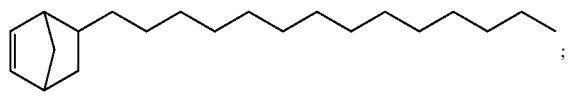

5-tetradecylbicyclo[2.2.1]hept-2-ene (TetradecylNB)

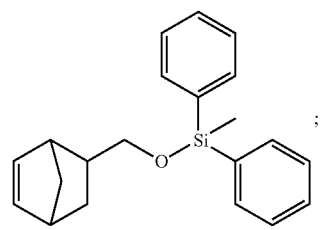

(bicyclo[2.2.1]hept-5-en-2-ylmethoxy)(methyl)diphenylsilane (NBCH$_2$OSiMePh$_2$)

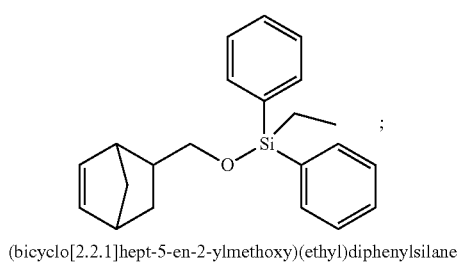

(bicyclo[2.2.1]hept-5-en-2-ylmethoxy)(ethyl)diphenylsilane

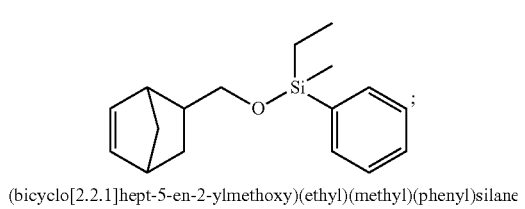

(bicyclo[2.2.1]hept-5-en-2-ylmethoxy)(ethyl)(methyl)(phenyl)silane

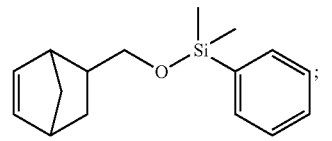

(bicyclo[2.2.1]hept-5-en-2-ylmethoxy)dimethyl(phenyl)silane

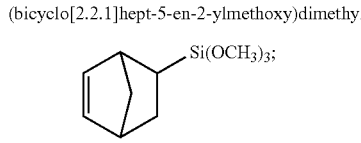

bicyclo[2.2.1]helpt-5-en-2-yltrimethoxysilane

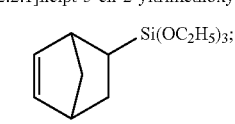

bicyclo[2.2.1]hept-5-en-2-yltriethoxysilane (TESNB, NBSi(OC$_2$H$_5$)$_3$)

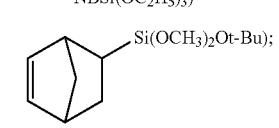

bicyclo[2.2.1]hept-5-en-2-yl(tert-butoxy)dimethoxysilane

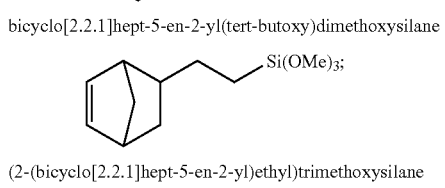

(2-(bicyclo[2.2.1]hept-5-en-2-yl)ethyl)trimethoxysilane

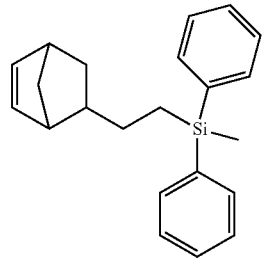

(2-(bicyclo[2.2.1]hept-5-en-2-yl)ethyl)(methyl)diphenylsilane

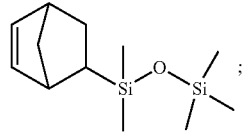

1-(bicyclo[2.2.1]hept-5-en-2-yl)-1,1,3,3,3-pentamethyldisiloxane

1,4-di(bicyclo[2.2.1]hept-5-en-2-yl)benzene

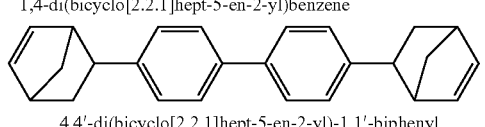

4,4'-di(bicyclo[2.2.1]hept-5-en-2-yl)-1,1'-biphenyl

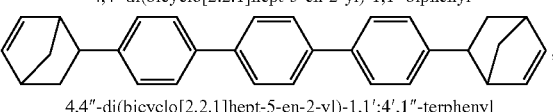

4,4''-di(bicyclo[2.2.1]hept-5-en-2-yl)-1,1':4',1''-terphenyl

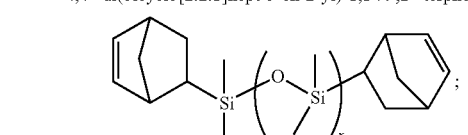

1,3-di(bicyclo[2.2.1]hept-5-en-2-yl)-1,1,3,3-tetramethyldisiloxane, when x = 1 and 1,5-di(bicyclo[2.2.1]hept-5-en-2-yl-1,1,3,3,5,5-hexamethyltrisiloxane, when x = 2

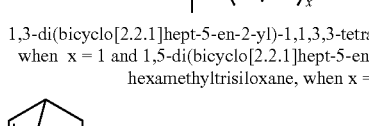

1,4-di(bicyclo[2.2.1]hept-5-en-2-yl)butane

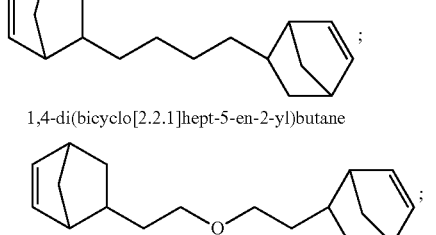

5,5'-(oxybis(ethane-2,1-diyl))bis(bicyclo[2.2.1]hept-2-ene)

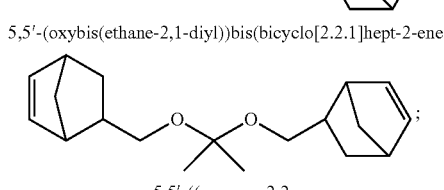

5,5'-((propane-2,2-diylbis(oxy))bis(methylene))bis(bicyclo[2.2.1]hept-2-ene)

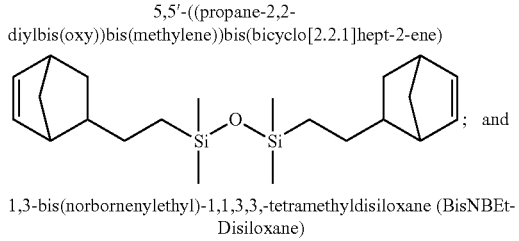

; and 1,3-bis(norbornenylethyl)-1,1,3,3,-tetramethyldisiloxane (BisNBEt-Disiloxane)

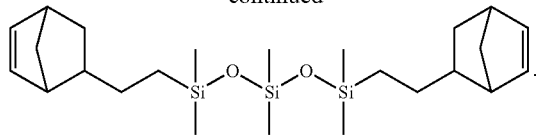

1,4-bis(norbornenylethyl)-1,1,3,3,5,5,-hexamethyltrisiloxane (BisNBEt-Trisiloxane)

In a further embodiment of this invention, the composition contains any of the procatalyst that would bring about the mass polymerization as described herein. Generally, such suitable procatalysts include a number of known neutral salts of transition metals, such as palladium or platinum, among others. Exemplary procatalysts without any limitation maybe selected from the group consisting of:

palladium (II) bis(tricyclohexylphosphine) dichloride;
palladium (II) bis(tricyclohexylphosphine) dibromide;
palladium (II) bis(tricyclohexylphosphine) diacetate;
palladium (II) bis(tricyclohexylphosphine) bis(trifluoroacetate);
palladium (II) bis(triisopropylphosphine) dichloride;
palladium (II) bis(triisopropylphosphine) dibromide;
palladium (II) bis(triisopropylphosphine) diacetate; and
palladium (II) bis(triisopropylphosphine) bis(trifluoroacetate).

As noted, the composition of this invention further contains a photoacid generator which when combined with the procatalyst will cause mass polymerization of the monomers contained therein under certain conditions as described herein. Surprisingly it has now been found that certain of the known photoactive or thermally active compounds, such as for example, photoacid generators can be used for this purpose.

In some embodiments the photoacid generator of the formula (V) is employed in the composition of this invention:

$$Aryl_1\text{-}Hal^{\oplus}\text{-}Aryl_2 An^{\ominus} \quad (V)$$

Wherein $Aryl_1$ and $Aryl_2$ are the same or different and are independently selected from the group consisting of substituted or unsubstituted phenyl, biphenyl and naphthyl; Hal is iodine or bromine; and $An^{\ominus}$ is a weakly coordinating anion (WCA) which is weakly coordinated to the cation complex. More specifically, the WCA functions as a stabilizing anion to the cation complex. The WCA is relatively inert in that it is non-oxidative, non-reducing, and non-nucleophilic. In general, the WCA can be selected from borates, phosphates, arsenates, antimonates, aluminates, boratobenzene anions, carborane, halocarborane anions, sulfonamidate and sulfonates Representative examples of the compounds of formula (V) may be listed as follows:

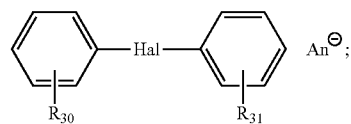
(V1)

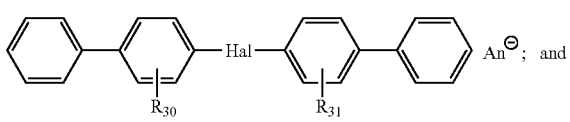
(V2)

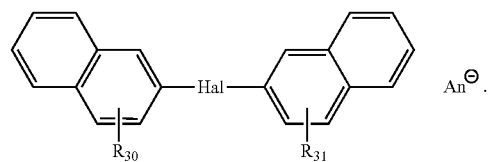
(V3)

Wherein $R_{30}$ and $R_{31}$ are the same or different and independently of each other selected from methyl, ethyl, linear or branched $(C_3\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_3)$alkyl, $(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy$(C_1\text{-}C_3)$alkyl and $(C_6\text{-}C_{10})$-aryloxy. It should further be noted that more than one $R_{30}$ and $R_{31}$ substituent can be present in aforementioned compounds of formula (V1), (V2) or (V3).

Non-limiting examples of suitable photoacid generators that may be employed in the composition of this invention are listed below:

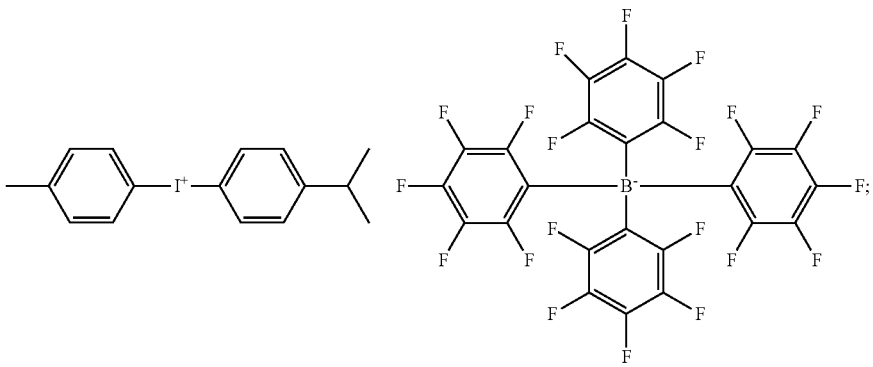

tolylcumyliodonium-tetrakis pentafluorophenylborate, commercially available under the tradename Rhodorsil 2074 ® from Bluestar Silicones -continued
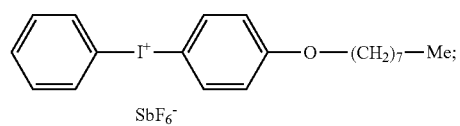
[4-(octyloxy)phenyl]-phenyliodonium (hexafluoro)antimonate (OPPI SbF₆)
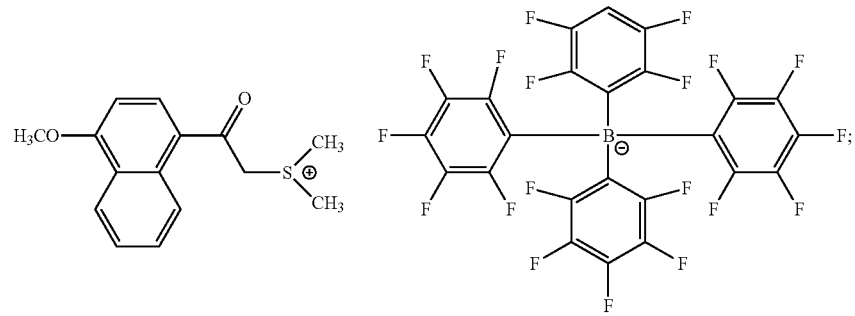
(2-(4-methoxynaphthalen-1-yl)-2-oxoethyl)dimethylsulfonium tetrakis(perfluorophenyl)borate
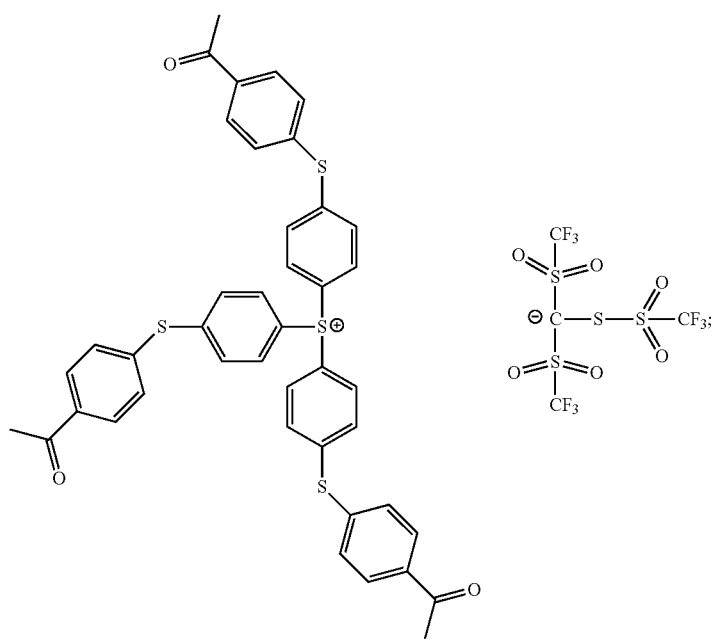
tris(4-((4-acetylphenyl)thio)phenyl)sulfonium tris((trifluoromethyl)sulfonyl)methanide
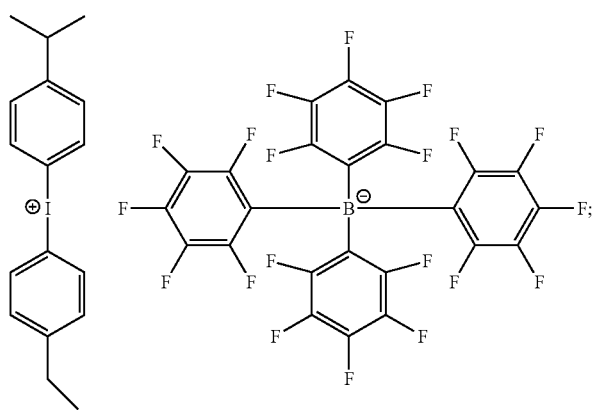
(4-ethylphenyl)(4-isopropylphenyl)iodonium tetrakis(perfluorophenyl)borate

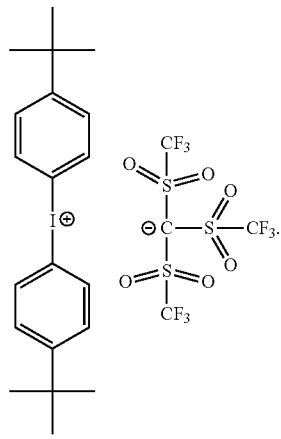

di-(p-t-butylphenyl)iodonium tris(trifluoromethanesulfonyl)methanide

However, any of the other known photoactive or thermally active compounds which generate the photoacid generator for the procatalysts employed herein can also be used in the composition of this invention. All such compounds are part of this invention.

In some other embodiments other known activators such as the ones enumerated below may also be used as additional components in the composition of this invention:

lithium tetrakis(pentafluorophenyl)borate;
lithium tetrakis(pentafluorophenyl)borate etherate;
lithium tetrakis(pentafluorophenyl)borate isopropanolate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate; and
dimethylanilinium tetrakis(pentafluorophenyl)borate.

As noted, surprisingly, it has now been found that employing a suitable photoactive initiator can trigger the mass polymerization of the monomers when the composition is subjected to a suitable radiation. As further noted any of the photoactive or thermally active compounds that can bring about such an effect can be employed in the composition of this invention.

Accordingly, in some embodiments of this invention the composition of this invention may additionally contain a photosensitizer compound which can accelerate the formation of the acid from the photoacid generator when subjected to radiation at a particular wavelength. For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, thioxanthen-9-ones, and mixtures thereof.

In some embodiments the composition of this invention encompasses a photosensitizer, which is of the formula (II):

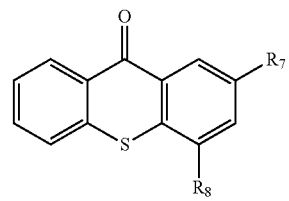

(II)

wherein $R_7$ and $R_8$ are the same or different and independently of each other selected from hydrogen, halogen, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12}$-alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl and $(C_6-C_{10})$-aryloxy.

In some exemplary embodiments, suitable sensitizer components include 2-chlorothioxanthen-9-one (CTX), 2,4-diethylthioxanthone (DETX), 2-isopropylthioxanthone, 4-isopropylthioxane (ITX), thioxanthene (TX), phenothiazine, and mixtures in any combination thereof. Generally, photosensitizers absorb energy from the radiated light source and transfers that energy to the desirable substrate/reactant, which in the present invention is the photoactive initiator employed in the composition of this invention. Surprisingly, it has now been found that all of the above noted thioxanthones provide much faster curing of the compositions of this invention when compared with 1-chloro-4-propoxythioxanthone (commercially sold under the name CPTX from Lambson), as further illustrated by specific examples that follow.

Advantageously it has now been observed that use of a photosensitizer which does not release a molecule or ionic component which does not poison the palladium procatalyst is a suitable photosensitizer. For example, it is known that a photosensitizer such as 1-chloro-4-propoxythioxanthone releases chloride ion which can poison the palladium procatalyst and/or reduce the activity of the procatalyst thereby hindering the mass polymerization of the monomers employed in the composition of this invention. Surprisingly, it has now been found that use of various other xanthone derivatives which are within the scope of the compound of formula (II) facilitates mass polymerization of the monomers employed in the composition of this invention at a much faster rate than previously known. In addition, complete mass polymerization of the monomers can be achieved when exposed to suitable irradiation at lower temperatures than the previously known catalysts. For instance, as noted above simultaneous exposure to radiation and heating to temperatures as low as 50 to 100° C., it is now possible to affect mass polymerization with conversion rates of up to 99 to 100 percent.

Any amounts of procatalyst, photoacid generator and photosensitizer can be employed in the composition of this invention which will bring about the intended result. Generally, the molar ratio of monomer:procatalyst:photoacid generator:photosensitizer is in the range of 10,000:1:2:4 to 5,000:1:4:8 or lower. In some other embodiments such monomer: procatalyst:photoacid generator:photosensitizer is 15,000:1:2:4, 20,000:1:2:4 or higher.

In some embodiments of this invention the composition of this invention may additionally contain viscosity modifiers, adhesion promoters and the like. An example of adhesion promoter is a compound of formula (V):

$$G_1\text{-}A\text{-}G_2 \quad (V)$$

wherein $G_1$ is a surface-active group, for example, a silane or a silazane group, A is a single bond or a connecting, spacer or bridging group selected from $(CZ_2)_g$, $(CH_2)_g$—$(CH=CH)_h$—$(CH_2)_g$, $(CH_2)_g$—O—$(CH_2)_g$, $(CH_2)_g$—$C_6Q_{10}$—$(CH_2)_g$, and $C(O)$, where each g is independently an integer from 0 to 12, h is an integer from 1-6, Z is independently H or F, $C_6Q_{10}$ is cyclohexyl that is substituted with Q, Q is independently H, F, $CH_3$, $CF_3$, or $OCH_3$, and $G_2$ is a crosslinkable group selected from a maleimide, a monoalkylmaleimide, a dialkylmaleimide, an epoxy, a vinyl, an acetylene, an indenyl, a cinnamate or a coumarin group, or comprises a substituted or unsubstituted maleimide portion, an epoxide portion, a vinyl portion, an acetylene portion, an indenyl portion, a cinnamate portion or a coumarin portion, and the like.

Illustrative members within the compound of formula of (V) may be enumerated as follows:

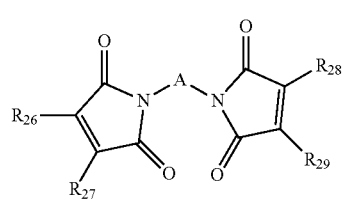

(V₁)

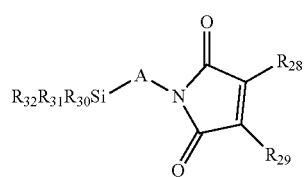

(V₂)

Wherein A is as defined above. In some embodiments A is selected from methylene, ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene. $R_{26}$, $R_{27}$, $R_{28}$ and $R_{29}$ are independently of each other selected from hydrogen, $(C_1\text{-}C_6)$alkyl, and $(C_6\text{-}C_{10})$aryl. $R_{30}$, $R_{31}$ and $R_{32}$ are independently of each other selected from halogen, silazane, $(C_1\text{-}C_{12})$alkyl, optionally substituted $(C_6\text{-}C_{20})$aryl or optionally substituted $(C_2\text{-}C_{20})$heteroaryl, $(C_1\text{-}C_{12})$alkoxy, $(C_1\text{-}C_{12})$alkylamino, optionally substituted $(C_6\text{-}C_{20})$aryloxy and optionally substituted $(C_2\text{-}C_{20})$heteroaryloxy.

Non-limiting examples within the scope of compounds of formula ($V_2$) are shown below:

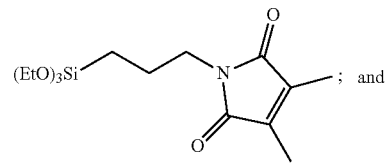

1-[tri(ethoxy)silyl]-propyl-3,4-dimethyl-1H-pyrrole-2,5-dione (DMMI-Pr-TEOS)

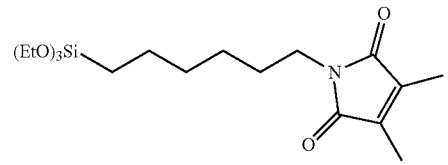

1-[tri(ethoxy)silyl]-hexyl-3,4-dimethyl-1H-pyrrole-2,5-dione (DMMI-Hex-TEOS)

Advantageously, it has further been found that the composition according to this invention forms a substantially transparent object or a film when mass polymerized, generally, by exposure to suitable UV irradiation in the wavelength from about 250 nm to 400 nm and then subjecting to a temperature from 50° C. to 100° C. That is to say, that when the composition of this invention is exposed to suitable radiation and then heated to certain elevated temperature, the monomers undergo mass polymerization to form three dimensional objects, such as films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light. It should be further noted that exposure to any suitable radiation and temperature that is suitable to carry out this mass polymerization can be employed, such as for example, suitable exposure to radiation in the UV region, 280 nm to 400 nm and temperatures in the range of from about 50° C. to 100° C. as indicated above. However, any other suitable radiation and temperatures below 50° C. or higher than 100° C. can also be employed. In some embodiments the temperature employed to 60° C., 70° C., 80° C., 90° C. or higher than 120° C.

In another embodiment of this invention, the composition of this invention encompasses a mixture of 5-hexylbicyclo [2.2.1]hept-2-ene (HexylNB), bicyclo[2.2.1]hept-5-en-2-yl-methyl acetate (MeOAcNB), palladium bis(tricyclohexylphosphine)diacetate, tolylcumyliodonium-tetrakis pentafluorophenylborate and 2-chlorothioxanthen-9-one (CTX);

a mixture of 5-decylbicyclo[2.2.1]hept-2-ene (DecylNB), bicyclo[2.2.1]hept-5-en-2-ylmethyl acetate (MeOAcNB), palladium bis(tricyclohexylphosphine)diacetate, tolylcumyliodonium-tetrakis pentafluorophenylborate and 2-chlorothioxanthen-9-one (CTX);

a mixture of 5-decylbicyclo[2.2.1]hept-2-ene (DecylNB), bicyclo[2.2.1]hept-5-en-2-ylmethyl acetate (MeOAcNB), palladium bis(tricyclohexylphosphine)diacetate, tolylcumyliodonium-tetrakis pentafluorophenylborate and 2,4-diethylthioxanthone (DETX);

a mixture of 5-decylbicyclo[2.2.1]hept-2-ene (DecylNB), bicyclo[2.2.1]hept-5-en-2-ylmethyl acetate (MeOAcNB), palladium bis(tricyclohexylphosphine)diacetate, tolylcumyliodonium-tetrakis pentafluorophenylborate and a mixture of 2-isopropylthioxanthone and 4-isopropylthioxanthone (ITX);

a mixture of 5-phenethylbicyclo[2.2.1]hept-2-ene (PENB), 5-(2-([1,1'-biphenyl]-2-yloxy)ethyl)bicyclo[2.2.1]hept-2-ene (NBEtOPhPh), palladium bis(tricyclohexylphosphine)diacetate, tolylcumyliodonium-tetrakis pentafluorophenylborate and a mixture of 2-isopropylthioxanthone and 4-isopropylthioxanthone (ITX);

a mixture of 5-decylbicyclo[2.2.1]hept-2-ene (DecylNB), 5-(2-([1,1'-biphenyl]-2-yloxy)ethyl)bicyclo[2.2.1]hept-2-ene (NBEtOPhPh), palladium bis(tricyclohexylphosphine)diacetate, tolylcumyliodonium-tetrakis pentafluorophenylborate and a mixture of 2-isopropylthioxanthone and 4-isopropylthioxanthone (ITX);

a mixture of 5-hexylbicyclo[2.2.1]hept-2-ene (HexylNB), bicyclo[2.2.1]hept-5-en-2-ylmethyl acetate (MeOAcNB), palladium bis(tricyclohexylphosphine)diacetate, tolylcumyliodonium-tetrakis pentafluorophenylborate and a mixture of 2-isopropylthioxanthone and 4-isopropylthioxanthone (ITX); and a mixture of 5-decylbicyclo[2.2.1]hept-2-ene (DecylNB), bicyclo[2.2.1]hept-5-en-2-ylmethyl acetate (MeOAcNB), palladium bis(tricyclohexylphosphine)diacetate, tolylcumyliodonium-tetrakis pentafluorophenylborate and thioxanthone (TX).

In a further aspect of this invention there is provided a kit for forming a substantially transparent object, such as a film. There is dispensed in this kit a composition of this invention. Accordingly, in some embodiments there is provided a kit in which there is dispensed one or more monomers of formula (I) and optionally one or more monomers of formula (III) and/or formula (IV) in any combination thereof so as to obtain a desirable result and/or for intended purpose. Further, said kit comprises a procatalyst, such as a palladium procatalyst as described herein, a photoacid generator and a photosensitizer. The monomers of formula (I), formulae (III) and (IV) are the ones as described hereinabove.

In some embodiments, the aforementioned kit encompasses one or more monomers of formula (I). In some other embodiments the kit of this invention encompasses at least two distinct monomers of formula (I). Any of the monomers of formula (I) as described herein can be used in this embodiment. Further, these two or more monomers of formula (I) are completely miscible or soluble to form a clear solution at room temperature. In some embodiments the monomer mixture may become a clear solution at slightly elevated temperature, such as for example, 30° C. or 40° C. or 50° C., before they undergo mass polymerization when exposed to suitable radiation. In another aspect of this embodiment of this invention the composition of this invention undergoes mass polymerization when exposed to suitable radiation and later heated to a temperature of from 50° C. to 100° C. for a sufficient length of time to form a three dimensional object such as a polymeric film. That is to say that the composition of this invention is poured onto a surface or onto a substrate which needs to be encapsulated, and exposed to suitable radiation and heated to a temperature of 50° C. to 100° C. in order for the monomers to undergo polymerization to form a solid transparent polymer which could be in the form of a transparent film. Generally, as already noted above, such polymerization can be completed after exposure to irradiation at 50° C., 60° C., 70° C., 80° C., 90° C., 100° C. or higher. The heating can also be carried out in stages to complete the polymerization, for example to 60° C. for 5 minutes, and then heating to 70° C. for 15 minutes and so on. By practice of this invention it is now possible to obtain polymeric films on such substrates which are substantially transparent film. The "substantially transparent film" as used herein means that the films formed form the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

In some embodiments of this invention the kit as described herein encompasses all of the compositions described hereinabove.

In yet another aspect of this invention there is further provided a method of forming a substantially transparent film for the fabrication of a variety of optoelectronic device comprising:

forming a homogeneous clear composition comprising one or more monomers of formula (I), a procatalyst, a photoacid generator and a photosensitizer;

coating a suitable substrate with the composition or pouring the composition onto a suitable substrate to form a film; and exposing the film to a suitable irradiation and heating the film to a suitable temperature to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 100° C. for about 1 to 60 minutes, although other appropriate temperatures and times can be used. In some embodiments the substrate is baked at a temperature of from about 60° C. to about 90° C. for 2 minutes to 10 minutes. In some other embodiments the substrate is baked at a temperature of from about 60° C. to about 90° C. for 5 minutes to 20 minutes.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided a optically transparent film obtained by the mass polymerization of the composition as described herein. In another embodiment there is also provided an optoelectronic device comprising the transparent film of this invention as described herein.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
NBEtOPhPh-5-(2-([1,1'-biphenyl]-2-yloxy)ethyl)bicyclo[2.2.1]hept-2-ene; MeOAcNB—bicyclo[2.2.1]hept-5-en-2-ylmethyl acetate; PENB-5-phenethylbicyclo[2.2.1]hept-2-ene; HexylNB-5-hexylbicyclo[2.2.1]hept-2-ene; DecylNB-5-decylbicyclo[2.2.1]hept-2-ene; DCPD—dicyclopentadiene; Rhodorsil 2074-tolylcumyliodonium-tetrakis pentafluorophenylborate;
Pd785-palladium bis(tricyclohexylphosphine)diacetate; CTX-2-chlorothioxanthen-9-one;
DETX-2,4-diethylthioxanthone; ITX—a mixture of 2-isopropylthioxanthone and 4-isopropylthioxanthone; TX-thioxanthone; CPTX-1-chloro-4-propoxythioxanthone; GPC-gel permeation chromatography; $M_w$-weight average molecular weight; PDI-polydispersity index; cP-centipoise.

Various monomers as used herein are either commercially available or can be readily prepared following the procedures as described in the co-pending U.S. patent application Ser. No. 15/253,980, filed Sep. 1, 2016.

Example 1

Mass Polymerization of HexylNB with Pd-785 and ITX

In a glass bottle, Pd785 (0.0044 g, 0.00006 mmol), Rhodorsil 2074 (0.0113 g, 0.0011 mmol) and ITX (0.0057 g, 0.0022 mmol) were dissolved in 0.4 g of toluene. HexylNB (10 g, 56.08 mmol) was added to form a clear solution, the monomer:procatalyst:photoacid generator:photosensitizer ratio was at 10,000:1:2:4. The solution was UV light exposed (LED 395 nm for 3 min.) at room temperature and then heated to 100° C. and kept at that temperature for 1 hour. The solution turned into a solid indicating the monomer was fully polymerized, as confirmed by TGA. The residue percentage from isothermal TGA (1 h at 100° C.) was >98%. The heat of reaction from UV DSC (UV LED for 3 min at r.t. and ramp to 140° C. at 10° C./min) was 165 J/g. The polymerization started immediately with temperature increase and was completed in 6 min. The unexposed solution was free flowing even after 3 weeks at room temperature.

Example 2-10

Mass Polymerization of Various Monomers with Pd-785

The procedures of Example 1 were substantially repeated in these Examples 2 to 10 except that no solvent was used and various different monomers and photosensitizers as listed in Table 1. The heat of reaction from UV DSC (isothermal at 70° C. and UV exposed) are also summarized in Table 1.

TABLE 1

| Example No. | Monomers (molar ratio) | Photosensitizer | UV DSC, J/g |
|---|---|---|---|
| 2 | HexylNB/MeOAcNB (95/5) | CTX | 306 |
| 3 | DecylNB/MeOAcNB (95/5) | CTX | 160 |
| 4 | DecylNB/MeOAcNB (95/5) | DETX | 163 |
| 5 | PENB/NBEtOPhPh (95/5) | ITX | 161 |
| 6 | PENB/NBEtOPhPh (80/20) | ITX | 264 |
| 7 | DecylNB/MeOAcNB (95/5) | ITX | 154 |
| 8 | DecylNB/NBEtOPhPh (95/5) | ITX | 158 |
| 9 | HexylNB/MeOAcNB (95/5) | ITX | 227 |
| 10 | DecylNB/MeOAcNB (95/5) | TX | 168 |

Example 11

Mass Polymerization of DCPD/MeOAcNB with Pd-785 and ITX

The procedures of Example 1 were substantially repeated in this Example 11 except that no solvent was used and DCPD/MeOAcNB (91/9 molar ratio) was employed. The heat of reaction from UV DSC was 250 J/g. The polymerization started immediately with temperature increase and was completed in 11 min.

Comparative Example 1

The procedures of Example 1 were substantially repeated in this Comparative Example 1 except that CPTX was used instead of ITX in the composition. Total heat of reaction from UV DSC was 74 J/g and the polymerization did not start until 70° C. and was finished in 7 min. The residue percentage from isothermal TGA was 85%. This indicates that during the UV exposure CPTX releases a chloride ion that partially deactivates Pd-catalyst.

Comparative Example 2

The procedures of Example 2 were substantially repeated in this Comparative Example 2 except that CPTX was used instead of CTX in the composition. Total heat of reaction from UV DSC was 24 J/g.

Comparative Example 3

The procedures of Examples 3 were substantially repeated in this Comparative Example 3 except that CPTX was used instead of CTX in the composition. Total heat of reaction from UV DSC was 19 J/g.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A kit for forming a substantially transparent object comprising:
    5-hexylbicyclo[2.2.1]hept-2-ene (HexylNB), bicyclo[2.2.1]hept-5-en-2-ylmethyl acetate (MeOAcNB), palladium bis(tricyclohexylphosphine)diacetate, tolylcumyliodonium-tetrakis pentafluorophenylborate and 2-chlorothioxanthen-9-one (CTX).

* * * * *